(12) United States Patent  (10) Patent No.: US 11,936,103 B2
Tsunemori et al.  (45) Date of Patent: Mar. 19, 2024

(54) CONDUCTIVE FILM FOR ANTENNAS, AND ANTENNA

(71) Applicant: TEIJIN LIMITED, Osaka (JP)

(72) Inventors: Hideyuki Tsunemori, Osaka (JP); Hiroshi Okamoto, Osaka (JP); Tomoya Nakanishi, Osaka (JP)

(73) Assignee: TEIJIN LIMITED, Osaka (JP)

( * ) Notice: Subject to any disclaimer, the term of this patent is extended or adjusted under 35 U.S.C. 154(b) by 150 days.

(21) Appl. No.: 17/768,974

(22) PCT Filed: Oct. 6, 2020

(86) PCT No.: PCT/JP2020/037828
§ 371 (c)(1),
(2) Date: Apr. 14, 2022

(87) PCT Pub. No.: WO2021/085051
PCT Pub. Date: May 6, 2021

(65) Prior Publication Data
US 2023/0006341 A1  Jan. 5, 2023

(30) Foreign Application Priority Data

Oct. 29, 2019 (JP) .................................. 2019-196288
Mar. 23, 2020 (JP) .................................. 2020-051079

(51) Int. Cl.
*H01Q 1/38* (2006.01)
*B32B 15/09* (2006.01)
*B32B 15/20* (2006.01)
*H01Q 13/08* (2006.01)

(52) U.S. Cl.
CPC .............. *H01Q 1/38* (2013.01); *B32B 15/09* (2013.01); *B32B 15/20* (2013.01); *H01Q 13/08* (2013.01)

(58) Field of Classification Search
CPC ............. H01Q 1/38; H01Q 1/40; H01Q 13/08
See application file for complete search history.

(56) References Cited

U.S. PATENT DOCUMENTS

| 5,872,882 | A | 2/1999 | Woudenberg et al. |
| 5,876,851 | A | 3/1999 | Matsumura et al. |
| 2012/0289655 | A1 | 11/2012 | Sumita et al. |
| 2014/0357809 | A1 | 12/2014 | Miyake et al. |
| 2015/0028107 | A1 | 1/2015 | Fischer et al. |
| 2016/0024301 | A1* | 1/2016 | Hayashida ............. C08K 5/521 523/451 |

(Continued)

FOREIGN PATENT DOCUMENTS

| JP | 8-41362 | 2/1996 |
| JP | 2009-280636 | 12/2009 |
| JP | 2010-195846 | 9/2010 |

(Continued)

OTHER PUBLICATIONS

Supplementary European Search Report dated Nov. 22, 2022, in European Patent Application No. 20882436.7, 4 pages.
Notice of Reasons for Refusal dated Nov. 22, 2023, in Japanese Patent Application No. 2021-554241, with English-language translation, 10 pages.

(Continued)

*Primary Examiner* — Hoang V Nguyen
(74) *Attorney, Agent, or Firm* — Wenderoth, Lind & Ponack, L.L.P.

(57) ABSTRACT

Provided is a conductive film for antennas, in which a conducting film and a substrate made of a polycarbonate resin material containing a polycarbonate resin are laminated, and the polycarbonate resin contains, as main constituent units, a unit (A) represented by the following formula (1) and/or a unit (B) represented by the following formula (2). The conductive film for antennas has low dielectric characteristics and bendability, can form an antenna with a low transmission loss, and has excellent adhesion to the conducting film.

[Chem. 1]

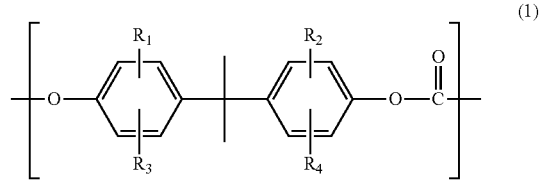

(In the formula (1), $R_1$ and $R_2$ each independently represent an alkyl group having 1 to 6 carbon atoms or a halogen atom, and $R_3$ and $R_4$ each independently represent a hydrogen atom, an alkyl group having 1 to 6 carbon atoms, or a halogen atom.)

[Chem. 2]

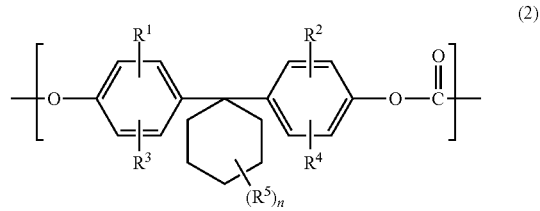

(In the formula (2), $R^1$ and $R^2$ each independently represent an alkyl group having 1 to 6 carbon atoms or a halogen atom, $R^3$ and $R^4$ each independently represent a hydrogen atom, an alkyl group having 1 to 6 carbon atoms, or a halogen atom, $R^5$ represents a halogen atom, an alkyl group having 1 to 20 carbon atoms, or a cycloalkyl group having 3 to 20 carbon atoms, and n represents an integer of 0 to 10.)

20 Claims, No Drawings

(56) References Cited

U.S. PATENT DOCUMENTS

| | | | |
|---|---|---|---|
| 2018/0015697 A1* | 1/2018 | Ichiki | C08F 265/06 |
| 2018/0312688 A1 | 11/2018 | Tsunemori et al. | |
| 2019/0390006 A1 | 12/2019 | Tsunemori et al. | |

FOREIGN PATENT DOCUMENTS

| | | | |
|---|---|---|---|
| JP | 2011-66610 | 3/2011 | |
| JP | 2011-144283 | 7/2011 | |
| JP | 2013-18938 | 1/2013 | |
| JP | 2013-221072 | 10/2013 | |
| JP | 2015-511741 | 4/2015 | |
| JP | 2016-56224 | 4/2016 | |
| JP | 2018-95669 | 6/2018 | |
| JP | 2018-203975 | 12/2018 | |
| WO | 2017/073508 | 5/2017 | |
| WO | 2018/139402 | 8/2018 | |
| WO | WO-2019187709 A1 * | 10/2019 | B01J 31/0205 |

OTHER PUBLICATIONS

International Preliminary Report on Patentability and Written Opinion dated May 3, 2022 in corresponding International (PCT) Patent Application No. PCT/JP2020/037828.

International Search Report dated Dec. 15, 2020 in International (PCT) Application No. PCT/JP2020/037828.

* cited by examiner

CONDUCTIVE FILM FOR ANTENNAS, AND ANTENNA

TECHNICAL FIELD

The present invention relates to a conductive film having excellent adhesion to a conducting film and having both bendability and low dielectric characteristics.

The invention also relates to a wide band antenna using the conductive film according to the invention, which can be used in a relatively high frequency band such as a microwave or millimeter wave band, and an electronic device including the antenna.

BACKGROUND ART

An antenna needs to efficiently transmit high frequencies to a space and efficiently receive the high frequencies propagating in the space. Since a material constituting the antenna needs to have excellent electrical conductivity, a laminated body in which a plastic material as a dielectric is coated with a conductor by printing, vapor deposition, or the like is used. In the related art, a conducting film such as cooper or silver has been used as the conductor. On the other hand, as the transmission and reception via networks both inside and outside a room have become widespread, antennas are installed in various places. Under these circumstances, antennas with even higher transparency have been developed so as not to spoil a landscape of an installation location.

For example, PTL 1 provides a technique of providing an antenna pattern formed of a conductor mesh layer on a transparent substrate made of a polyethylene terephthalate film. PTL 2 describes a transparent conductive film in which a conducting film containing silver as a main component is laminated on a polyethylene terephthalate film.

Since a loss during high frequency propagation is reduced as radio waves have higher frequency, dielectric characteristics of the dielectric are important. In particular, since a heat loss in the dielectric is proportional to a loss coefficient expressed by a product of a relative dielectric constant and a dielectric loss tangent, low dielectric characteristics are required. Since the dielectric characteristics of the plastic material as a dielectric are determined by a molecular structure of a constituent unit, a material having low dielectric characteristics and excellent adhesion to the conducting film is required for the dielectric.

CITATION LIST

Patent Literature

PTL 1: JP-A-2011-66610
PTL 2: WO 2018/139402

SUMMARY OF INVENTION

Technical Problem

A main object of the invention is to provide a conductive film including a conducting film and a substrate made of a polycarbonate resin material containing a polycarbonate resin, which has low dielectric characteristics and bendability, can form an antenna with low transmissionloss, and has excellent adhesion to the conducting film.

A secondary object of the invention is to provide a transparent conductive film including a conducting film and a transparent substrate made of a polycarbonate resin material containing a polycarbonate resin, which has high transparency in addition to the above.

Solution to Problem

As a result of intensive studies, the present inventors have found that the above objects can be achieved by using a substrate made of a polycarbonate resin material containing a polycarbonate resin having a specific structural unit. As a result of studies based on such a finding, the invention has been completed.

That is, according to the invention, the following (configuration 1) to (configuration 20) are provided.
(Configuration 1)

A conductive film for antennas, in which a conducting film and a substrate made of a polycarbonate resin material containing a polycarbonate resin are laminated, the conducting film and the substrate being stacked, the polycarbonate resin containing, as main constituent units, a unit (A) represented by the following formula (1) and/or a unit (B) represented by the following formula (2).

[Chem. 1]

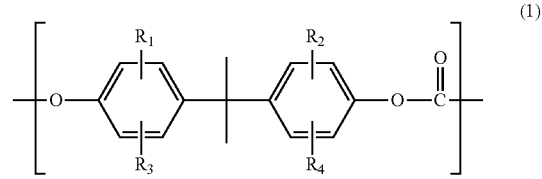

(In the formula (1), $R_1$ and $R_2$ each independently represent an alkyl group having 1 to 6 carbon atoms or a halogen atom, and $R_3$ and $R_4$ each independently represent a hydrogen atom, an alkyl group having 1 to 6 carbon atoms, or a halogen atom.)

[Chem. 2]

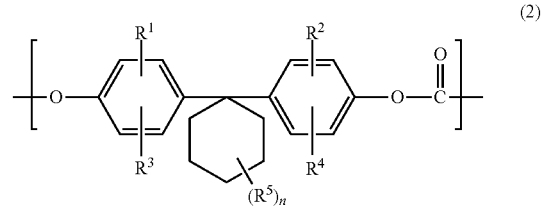

(In the formula (2), $R^1$ and $R^2$ each independently represent an alkyl group having 1 to 6 carbon atoms or a halogen atom, $R^3$ and $R^4$ each independently represent a hydrogen atom, an alkyl group having 1 to 6 carbon atoms, or a halogen atom, $R^5$ represents a halogen atom, an alkyl group having 1 to 20 carbon atoms, or a cycloalkyl group having 3 to 20 carbon atoms, and n represents an integer of 0 to 10.)
(Configuration 2)

The conductive film for antennas according to configuration 1, in which the polycarbonate resin is a polycarbonate resin containing the unit (A) represented by the formula (1) as the main constituent unit.
(Configuration 3)

The conductive film for antennas according to configuration 1 or 2, in which the polycarbonate resin is a polycarbonate resin containing 45 mol % or more of the unit (A) represented by the formula (1) in all constituent units.
(Configuration 4)
The conductive film for antennas according to any one of configurations 1 to 3, in which the unit (A) is a constituent unit derived from 2,2-bis(4-hydroxy-3-methylphenyl) propane.
(Configuration 5)
The conductive film for antennas according to any one of configurations 1 to 4, in which the polycarbonate resin material has a viscosity average molecular weight of 15,000 to 40,000.
(Configuration 6)
The conductive film for antennas according to configuration 1, in which the polycarbonate resin is a polycarbonate resin containing the unit (B) represented by the formula (2) as the main constituent unit.
(Configuration 7)
The conductive film for antennas according to configuration 1 or 6, in which the polycarbonate resin is a polycarbonate resin containing 45 mol % or more of the unit (B) represented by the formula (2) in all the constituent units.
(Configuration 8)
The conductive film for antennas according to any one of configurations 1, 6, and 7, in which the unit (B) is a constituent unit derived from 1,1-bis(4-hydroxy-3-methylphenyl)cyclohexane, 1,1-bis(3-tert-butyl-4-hydroxyphenyl)cyclohexane or 1,1-bis(4-hydroxy-3-methylphenyl)-3,3,5-trimethylcyclohexane.
(Configuration 9)
The conductive film for antennas according to any one of configurations 1, and 6 to 8, in which the polycarbonate resin material has a viscosity average molecular weight of 14,000 to 40,000.
(Configuration 10)
The conductive film for antennas according to any one of configurations 1 to 9, in which the polycarbonate resin material has a dielectric loss tangent of 0.0005 to 0.0030 at a frequency of 1 GHz to 10 GHz measured according to a cavity resonator perturbation method.
(Configuration 11)
The conductive film for antennas according to any one of configurations 1 to 10, in which the polycarbonate resin material contains 0.1 parts by weight to 2 parts by weight of an ultraviolet absorber with respect to 100 parts by weight of the polycarbonate resin.
(Configuration 12)
The conductive film for antennas according to any one of configurations 1 to 11, in which the polycarbonate resin material contains 0.0001 parts by weight to 1 part by weight of a phosphorus stabilizer and/or a hindered phenol antioxidant with respect to 100 parts by weight of the polycarbonate resin.
(Configuration 13)
The conductive film for antennas according to any one of configurations 1 to 12, in which the substrate is a film formed by an injection molding method or an injection compression molding method using the polycarbonate resin material.
(Configuration 14)
The conductive film for antennas according to any one of configurations 1 to 12, in which the substrate is a film formed by a melt extrusion method using the polycarbonate resin material.
(Configuration 15)
The conductive film for antennas according to any one of configurations 1 to 14, in which the substrate has a thickness of 1 μm to 500 μm, and the conducting film has a thickness of 1 μm to 70 μm.
(Configuration 16)
The conductive film for antennas according to any one of configurations 1 to 15, in which the conducting film is a metal thin film.
(Configuration 17)
The conductive film for antennas according to configuration 16, in which the metal thin film is a copper foil, and an antenna pattern is formed by the copper foil.
(Configuration 18)
The conductive film for antennas according to any one of configurations 1 to 17, in which the conducting film has a peel strength of 0.8 N/mm or more in a direction of 90 degrees with respect to the substrate.
(Configuration 19)
The transparent conductive film for antennas according to any one of configurations 1 to 18, which has a total light transmittance of 50% or more.
(Configuration 20)
An antenna including the conductive film according to any one of configurations 1 to 19.

Advantageous Effect

The conductive film according to the invention can form an antenna having both bendability and a low power loss. Further, the conductive film according to the invention preferably has good transparency, and can form an antenna that does not impair a landscape of an installation location. Therefore, industrial effects to be exhibited by the conductive film are remarkable.

DESCRIPTION OF EMBODIMENTS

<Conductive Film>
A conductive film according to the invention is made of a laminated body in which a conducting film and a substrate made of a polycarbonate resin material containing a polycarbonate resin are laminated.
In the conductive film according to the invention, an adhesion strength between a substrate and a copper foil is preferably 0.8 N/mm or more, more preferably 1.0 N/mm or more, and most preferably 1.2 N/mm or more. When the adhesion strength is poor, the copper foil may peel off. The adhesion strength can be obtained by measuring a peel strength by a tensile tester while peeling off the copper foil having a thickness of 18 μm in a direction of 90° with respect to a copper foil removal surface at a speed of 50 mm per minute in accordance with JIS C5016-1994.
The conductive film according to the invention preferably has a total light transmittance of 50% or more, more preferably 60% or more, still more preferably 703 or more, and most preferably 75% or more. When the total light transmittance is low, transparency may be impaired. The total light transmittance can be measured by a haze meter equipped with an integrating sphere in accordance with ISO 13468-1.
<Polycarbonate Resin Material>
The polycarbonate resin material according to the invention preferably has a dielectric loss tangent (frequency 1 GHz to 10 GHz) in a range of 0.0005 to 0.0030, more preferably in a range of 0.0005 to 0.0025, and still more preferably in a range of 0.0010 to 0.0020, which is measured by a cavity resonator perturbation method. When the dielectric loss tangent is within the above range, a heat loss of the conductive film is reduced, which is preferred.

Embodiment I of Invention

The polycarbonate resin used in the polycarbonate resin material constituting the substrate according to an embodiment I of the invention contains (A): a unit (A) represented by the following formula (1) as a main constituent unit.

[Chem. 3]

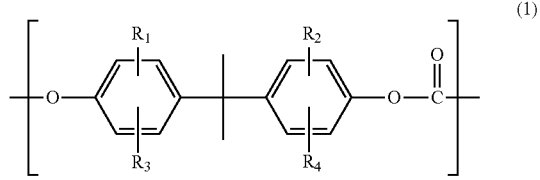

(1)

(In the formula (1), $R_1$ and $R_2$ each independently represent an alkyl group having 1 to 6 carbon atoms or a halogen atom, and $R_3$ and $R_4$ each independently represent a hydrogen atom, an alkyl group having 1 to 6 carbon atoms, or a halogen atom.)

The polycarbonate resin used in the embodiment I of the invention preferably has a ratio of the constituent unit (A) of 45 mol % or more, more preferably 50 mol % or more, still more preferably 60 mol % or more, particularly preferably 70 mol, or more, and most preferably 80 mol % or more, to all constituent units. The ratio of the constituent unit (A) is preferably 45 mol % or more since the dielectric characteristics are excellent.

Examples of a dihydric phenol from which the constituent unit (A) is derived include 2,2-bis(4-hydroxy-3-methylphenyl)propane (hereinafter, referred to as bisphenol C), 2,2-bis(4-hydroxy-3-isopropylphenyl)propane, 2,2-bis(3-t-butyl-4-hydroxyphenyl)propane, 2,2-bis(4-hydroxy-3,5-dimethylphenyl)propane, and 2,2-bis{(3,5-dibromo-4-hydroxyphenyl)phenyl}propane. The most suitable dihydric phenol is bisphenol C.

According to the invention, carbonate-bonded repeating units derived from other dihydric phenols as the dihydric phenol may be copolymerized as long as objects and properties of the invention are not impaired. Representative examples of such other dihydric phenols include hydroquinone, resorcinol, 4,4'-dihydroxydiphenyl, bis(4-hydroxyphenyl)methane, bis((4-hydroxy-3,5-dimethyl)phenyl) methane, 1,1-bis(4-hydroxyphenyl)ethane, 1,1-bis(4-hydroxyphenyl)-1-phenylethane, 2,2-bis(4-hydroxyphenyl) propane (bisphenol A), 2,2-bis{(4-hydroxy-3-phenyl) phenyl}propane, 2,2-bis(4-hydroxyphenyl)butane, 2,2-bis (4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 3,3-bis(4-hydroxyphenyl)pentane, 1,1-bis(4-hydroxyphenyl)cyclohexane, 1,1-bis(4-hydroxyphenyl)-4-isopropylcyclohexane, 1,1-(4-hydroxyphenyl)-3,3,5-trimethylcyclohexane, 9,9-bis(4-hydroxy-3methylphenyl) fluorene, 1,1'-bis-(4-hydroxyphenyl)-ortho-diisopropylbenzene, 1,1'-bis-(4-hydroxyphenyl)-meta-diisopropylbenzene, 1,1'-bis-(4-hydroxyphenyl)-para-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, 4,4'-dihydroxydiphenyl ester, 1,1-bis(4-hydroxyphenyl)-2-methylpropane, and 2,2-bis(4-hydroxyphenyl)-4-methylpentane, which can be used alone or in combination of two or more thereof. The most suitable dihydric phenol is bisphenol A.

The polycarbonate resin material used in the embodiment I of the invention preferably has a viscosity average molecular weight (Mv) of 15,000 to 40,000, more preferably 16,000 to 30,000, and still more preferably 18,000 to 28,000. When a polycarbonate resin material having a viscosity average molecular weight of less than 15,000 is used, sufficient toughness and cracking resistance may not be obtained. On the other hand, a polycarbonate resin material having a viscosity average molecular weight of more than 40,000 requires a high molding temperature or requires a special molding method, and thus may be inferior in versatility. Further, as the melt viscosity increases, the dependence on an injection speed tends to increase, and a yield may decrease due to a poor appearance or the like.

The viscosity average molecular weight of the polycarbonate resin material used in the embodiment I of the invention is obtained by first obtaining a specific viscosity ($\eta_{SP}$), which is calculated according to the following equation based on a solution obtained by dissolving 0.7 g of polycarbonate in 100 ml of methylene chloride at 20° C., using an Ostwald viscometer, Specific viscosity($\eta_{SP}$)=$(t-t_0)/t_0$

[$t_0$ is the second for methylene chloride to fall, and t is the second for the sample solution to fall]

and calculating the viscosity average molecular weight Mv based on the obtained specific viscosity ($\eta_{SP}$) according to the following equation.

$\eta_{SP}/c=[\eta]+0.45\times[\eta]^2 c$ ([$\eta$] is an intrinsic viscosity)

$[\eta]=1.23\times10^{-4}Mv^{0.83}$ $c=0.7$

Embodiment II of Invention

A polycarbonate resin used in the polycarbonate resin material constituting the substrate according to an embodiment II of the invention contains (B): a unit (B) represented by the following formula (2) as a main constituent unit.

[Chem. 4]

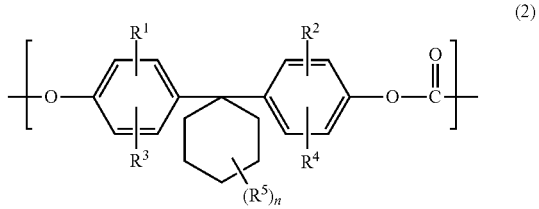

(2)

(in the formula (2), $R^1$ and $R^2$ each independently represent an alkyl group having 1 to 6 carbon atoms or a halogen atom, $R^3$ and $R^4$ each independently represent a hydrogen atom, an alkyl group having 1 to 6 carbon atoms, or a halogen atom, $R^5$ represents a halogen atom, an alkyl group having 1 to 20 carbon atoms, or a cycloalkyl group having 3 to 20 carbon atoms, and n represents an integer of 0 to 10.)

The polycarbonate resin used in the embodiment II of the invention preferably has a ratio of the constituent unit (B) of 45 mol % or more, more preferably 50 mol % or more, still more preferably 60 mol % or more, particularly preferably 70 mol % or more, and most preferably 80 mol % or more, to all the constituent units. The ratio of the constituent unit (B) is preferably 45 mol % or more since the dielectric characteristics are excellent.

Examples of a dihydric phenol from which the constituent unit (B) is derived include 1,1-bis(4-hydroxy-3-methylphenyl)cyclohexane, 1,1-bis(4-hydroxy-3-isopropylphenyl)cyclohexane, 1,1-bis(3-tert-butyl-4-hydroxyphenyl)cyclohexane, 1,1-bis(4-hydroxy-3,5-dimethylphenyl)cyclohexane, 1,1-bis(3,5-dibromo-4-hydroxyphenyl)cyclohexane, 1,1-bis(4-hydroxy-3-methylphenyl)-3,3,5-trimethylcyclohexane, 1,1-bis(4-hydroxy-3-isopropylphenyl)-3,3,5-trimethylcyclohexane, 1,1-bis(3-tert-butyl-4-hydroxyphenyl)-3,3,5-trimethylcyclohexane, 1,1-bis(4-hydroxy-3,5-dimethylphenyl)-3,3,5-trimethylcyclohexane, and 1,1-bis(3,5-dibromo-4-hydroxyphenyl)-3,3,5-trimethylcyclohexane. A suitable dihydric phenol is a constituent unit derived from 1,1-bis(4-hydroxy-3-methylphenyl)cyclohexane, 1,1-bis(3-tert-butyl-4-hydroxyphenyl)cyclohexane, or 1,1-bis(4-hydroxy-3-methylphenyl)-3,3,5-trimethylcyclohexane, and a particularly suitable dihydric phenol is 1,1-bis(4-hydroxy-3-methylphenyl)cyclohexane and/or 1,1-bis(4-hydroxy-3-methylphenyl)-3,3,5-trimethylcyclohexane.

According to the invention, carbonate-bonded repeating units derived from other dihydric phenols as the dihydric phenol may be copolymerized as long as objects and properties of the invention are not impaired. Representative examples of such other dihydric phenols include hydroquinone, resorcinol, 4,4'-dihydroxydiphenyl, bis(4-hydroxyphenyl)methane, bis((4-hydroxy-3,5-dimethyl)phenyl)methane, 1,1-bis(4-hydroxyphenyl)ethane, 1,1-bis(4-hydroxyphenyl)-1-phenylethane, 2,2-bis(4-hydroxyphenyl)propane (bisphenol A), 2,2-bis{(4-hydroxy-3-methyl)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 3,3-bis(4-hydroxyphenyl)pentane, 1,1-bis(4-hydroxyphenyl)cyclohexane, 1,1-bis(4-hydroxyphenyl)-4-isopropylcyclohexane, 1,1-(4-hydroxyphenyl)-3,3,5-trimethylcyclohexane, 9,9-bis(4-hydroxy-3methylphenyl)fluorene, 1,1'-bis-(4-hydroxyphenyl)-ortho-diisopropylbenzene, 1,1'-bis-(4-hydroxyphenyl)-meta-diisopropylbenzene, 1,1'-bis-(4-hydroxyphenyl)-para-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, 4,4'-dihydroxydiphenyl ester, 1,1-bis(4-hydroxyphenyl)-2-methylpropane, and 2,2-bis(4-hydroxyphenyl)-4-methylpentane, which can be used alone or in combination of two or more thereof. The most suitable dihydric phenol is bisphenol A.

The polycarbonate resin material used in the embodiment II of the invention preferably has a viscosity average molecular weight (Mv) of 14,000 to 40,000, more preferably 15,000 to 30,000, and still more preferably 17,000 to 28,000. When a polycarbonate resin material having a viscosity average molecular weight of less than 14,000 is used, sufficient toughness and cracking resistance may not be obtained. On the other hand, a polycarbonate resin material having a viscosity average molecular weight of more than 40,000 requires a high molding temperature or requires a special molding method, and thus may be inferior in versatility. Further, as the melt viscosity increases, the dependence on an injection speed tends to increase, and a yield may decrease due to a poor appearance or the like.

In the embodiment II of the invention, the viscosity average molecular weight of the polycarbonate resin material is obtained by the same measurement method as the viscosity average molecular weight of the polycarbonate resin material used in the above embodiment I.

<Method for Producing Polycarbonate Resin>

The polycarbonate resin used in the invention is obtained by reacting a dihydric phenol with a carbonate precursor. Examples of a reaction method include an interfacial polycondensation method, a melt transesterification method, a solid phase transesterification method of a carbonate prepolymer, and a ring-opening polymerization method of a cyclic carbonate compound. In the case of interfacial polycondensation, a terminal terminator of monohydric phenols is usually used. The polycarbonate may be a branched polycarbonate obtained by polymerizing a trifunctional component, or may be a copolymerized polycarbonate obtained by copolymerizing an aliphatic dicarboxylic acid or an aromatic dicarboxylic acid, and a vinyl monomer.

In a reaction using, for example, phosgene as the carbonate precursor, the reaction is usually carried out in the presence of an acid binder and a solvent. Examples of the acid binder include alkali metal hydroxides such as sodium hydroxide and potassium hydroxide, or amine compounds such as pyridine. Examples of the solvent include halogenated hydrocarbons such as methylene chloride and chlorobenzene. In order to promote the reaction, for example, a catalyst such as a tertiary amine or a quaternary ammonium salt can also be used. At this time, the reaction temperature is usually 0° C. to 40° C., and the reaction time is several minutes to five hours.

A transesterification reaction using, for example, a carbonic acid diester as the carbonate precursor is performed by a method of stirring while heating an aromatic dihydroxy component and the carbonic acid diester in a predetermined ratio under an inert gas atmosphere to distill off the generated alcohols or phenols. The reaction temperature varies depending on the boiling point of the generated alcohols or phenols, and is usually in a range of 120° C. to 300° C. In the reaction, the pressure is reduced from an initial stage, and the reaction is completed while the generated alcohols or phenols are distilled off. In order to promote the reaction, a catalyst generally used in the transesterification reaction can also be used. Examples of the carbonic acid diester to be used in the transesterification reaction include diphenyl carbonate, dinaphthyl carbonate, bis(diphenyl) carbonate, dimethyl carbonate, diethyl carbonate, and dibutyl carbonate. Among these, diphenyl carbonate is particularly preferred.

Monofunctional phenols generally used as the terminal terminator can be used. In particular, in the case of the reaction using phosgene as the carbonate precursor, the monofunctional phenols are generally used as the terminal terminator for adjusting the molecular weight, and the obtained polycarbonate resin is excellent in thermal stability as compared with other polycarbonate resins because the terminal thereof is blocked by a group based on the monofunctional phenols. Specific examples of the monofunctional phenols include phenol, m-methylphenol, p-methylphenol, m-propylphenol, p-propylphenol, 1-phenylphenol, 2-phenyl, p-tert-butylphenol, p-cumylphenol, isooctylphenol, and p-long chain alkylphenol.

The polycarbonate resin used in the invention can be copolymerized with an aliphatic diol if necessary. Examples of the aliphatic diol include isosorbide: 1,4:3,6-dianhydro-D-sorbitol, tricyclodecanedimethanol (TCDDM), 4,8-bis (hydroxymethyl)tricyclodecane, tetramethylcyclobutandiol (TMCBD), 2,2,4,4-tetramethylcyclobutane-1,3-diol, a mixed isomer, cis/trans-1,4-cyclohexanedimethanol (CHDM), cis/trans-1,4-bis(hydroxymethyl)cyclohexane, cyclohex-1,4-ylenedimethanol, trans-1,4-cyclohexanedimethanol (tCHDM), trans-1,4-bis(hydroxymethyl)cyclohexane, cis-1,4-cyclohexanedimethanol (cCHDM), cis-1,4-bis(hydroxymethyl)cyclohexane, cis-1,2-cyclohexanedimethanol, 1,1'-bi(cyclohexyl)-4,4'-diol, spiroglycol, dicyclohexyl-4,4'-diol, 4,4'-dihydroxy bicyclohexyl, and poly(ethylene glycol).

The polycarbonate resin used in the invention can be copolymerized with fatty acids, if necessary. Examples of the fatty acids include 1,10-dodecandioic acid (DDDA), adipic acid, hexanedioic acid, isophthalic acid, 1,3-benzenedicarboxylic acid, terephthalic acid, 1,4-benzenedicarboxylic acid, 2,6-naphthalenedicarboxylic acid, 3-hydroxybenzoic acid (mHBA), and 4-hydroxybenzoic acid (pHBA).

The polycarbonate resin used in the invention contains a polyester carbonate obtained by copolymerizing an aromatic or aliphatic (including alicyclic) bifunctional carboxylic acid. The aliphatic bifunctional carboxylic acid is preferably α,ω-dicarboxylic acid. Preferred examples of the aliphatic bifunctional carboxylic acid include linear saturated aliphatic dicarboxylic acids such as sebacic acid (decanedioic acid), dodecaredioic acid, tetradecanedioic acid, octadecanedioic acid, and icosanedioic acid, and alicyclic dicarboxylic acids such as cyclohexanedicarboxylic acid. These carboxylic acids may be copolymerized within a range that does not inhibit the objects. The polycarbonate resin according to the invention can also be copolymerized with a constituent unit containing a polyorganosiloxane unit, if necessary.

The polycarbonate resin used in the invention may be obtained as a branched polycarbonate by copolymerizing a constituent unit containing a trifunctional or higher polyfunctional aromatic compound, if necessary. Preferred examples of the trifunctional or higher polyfunctional aromatic compound to be used in the branched polycarbonate include 4,6-dimethyl-2,4,6-tris(4-hydroxydiphenyl)heptene-2,2,4,6-trimethyl-2,4,6-tris(4-hydroxyphenyl) heptane, 1,3,5-tris(4-hydroxyphenyl)benzene, 1,1,1-tris(4-hydroxyphenyl)ethane, 1,1,1-tris(3,5-dimethyl-4-hydroxyphenyl) ethane, and trisphenols such as 2,6-bis(2-hydroxy-5-methylbenzyl)-4-methylphenol and 4-{4-[1,1-bis(4-hydroxyphenyl)ethyl]benzene}-α, α-dimethylbenzylphenol. Among these, 1,1,1-tris(4-hydroxyphenyl)ethane is preferred. The constituent unit derived from the polyfunctional aromatic compound is preferably 0.03 mol % to 1.5 mol %, more preferably 0.1 mol % to 1.2 mol %, and particularly preferably 0.2 mol % to 1.0 mol %, based on a total of 100 mol % of constituent units derived from other divalent components.

A branched structural unit may be derived not only from a polyfunctional aromatic compound, but also derived without using a polyfunctional aromatic compound such as a side reaction that occurs during a polymerization reaction in the melt transesterification method. A ratio of a branched structure can be calculated by $^1$H-NMR measurement.

<Components Other than Polycarbonate Resin>

The polycarbonate resin material used in the invention may contain known functional agents such as a release agent, a thermal stabilizer, a flow modifier, and an ultraviolet absorber, as long as the effects of the invention are not impaired.

(i) Release Agent

In the polycarbonate resin material used in the invention, a release agent may be used in combination as long as the effects of the invention are not impaired. Examples of the release agent include a fatty acid ester, a polyolefin wax (such as polyethylene wax, 1-alkene polymer, and a compound modified with a functional group-containing compound such as acid modification can also be used), a fluorine compound (such as fluorine oil represented by polyfluoroalkyl ether), a paraffin wax, and beeswax. Among these, a fatty acid ester is preferred in terms of availability, releasability, and transparency. A ratio of the other release agent to be used in combination with a silicone compound as a component B is preferably 0.005 to 0.2 parts by weight, more preferably 0.007 to 0.1 parts by weight, and still more preferably 0.01 to 0.06 parts by weight with respect to 100 parts by weight of the polycarbonate resin. When the content is less than the lower limit of the above range, an effect of improving the releasability is not clearly exerted, and when the content exceeds the upper limit, an adverse influence such as contamination to a mold during the molding is likely to occur.

Among these, the fatty acid ester used as a preferred release agent will be described in more detail. The fatty acid ester is an ester of an aliphatic alcohol and an aliphatic carboxylic acid. The aliphatic alcohol may be a monohydric alcohol or a dihydric or higher polyhydric alcohol. The number of carbon atoms in the alcohol is preferably in a range of 3 to 32, and more preferably in a range of 5 to 30. Examples of the monohydric alcohol include dodecanol, tetradecanol, hexadecanol, octadecanol, eicosanol, tetracosanol, ceryl alcohol, and triacontanol. Examples of the polyhydric alcohol include pentaerythritol, dipentaerythritol, tripentaerythritol, polyglycerol (triglycerol to hexaglycerol), ditrimethylolpropane, xylitol, sorbitol, and mannitol. The fatty acid ester according to the invention is more preferably a polyhydric alcohol.

On the other hand, the aliphatic carboxylic acid preferably has 3 to 32 carbon atoms, and an aliphatic carboxylic acid having 10 to 22 carbon atoms is particularly preferred. Examples of the aliphatic carboxylic acid include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid, and docosanoic acid (behenic acid) and unsaturated aliphatic carboxylic: acids such as palmitoleic acid, oleic acid, linoleic acid, linolenic acid, eicosenoic acid, eicosapentaenoic acid, and cetoleic acid. Among the above, the aliphatic carboxylic acid preferably has 14 to 20 carbon atoms. Among these, saturated aliphatic carboxylic acids are preferred. Since the aliphatic carboxylic acids are usually produced from natural fats and oils such as animal fats and oils (beef tallow, pork tallow, and the like) and vegetable fats and oils (palm oil and the like), these aliphatic carboxylic acids are usually a mixture containing other carboxylic acid components having different carbon atoms.

Therefore, the aliphatic carboxylic acid used in the invention is also produced from natural fats and oils, and is in the form of a mixture containing other carboxylic acid components. An acid value of the fatty acid ester is preferably 20 or less (substantially 0 can be taken). However, in the case of a complete ester (full ester), in order to improve the releasability, it is preferable that free fatty acids are contained, and in this regard, an acid value of the full ester is preferably in a range of 3 to 15. An iodine value of the fatty acid ester is preferably 10 or less (substantially 0 can be taken). These characteristics can be determined by a method defined in JIS K 0070.

The fatty acid ester described above may be either a partial ester or a full ester, and is preferably a partial ester in terms of more favorable releasability and durability, and particularly preferably a glycerin monoester. The glycerin monoester contains a monoester of glycerin and fatty acid as a main component. Preferred examples of the fatty acid include saturated fatty acids such as stearic acid, palmitic acid, behenic acid, arachic acid, montanic acid, and lauric acid, and unsaturated fatty acids such as oleic acid, linoleic acid, and sorbic acid. It is particularly preferable that the glycerin monoester contains a glycerin monoester of stearic acid, behenic acid, and palmitic acid as a main component. The fatty acid is synthesized from a natural fatty acid, and is a mixture as described above. Even in such a case, a ratio of the glycerin monoester in the fatty acid ester is preferably 60% by weight or more.

The partial ester is often inferior to the full ester in terms of thermal stability. In order to improve the thermal stability of the partial ester, the partial ester preferably has a sodium metal content of less than 20 ppm, more preferably less than 5 ppm, and still more preferably less than 1 ppm. The fatty acid partial ester having a sodium metal content of less than 1 ppm can be produced by producing a fatty acid partial ester by a usual method and then purifying the fatty acid partial ester by molecular distillation or the like.

Specifically, for example, there is a method in which a gas component and a low-boiling component are removed by a spray nozzle degassing apparatus, then a polyhydric alcohol component such as glycerin is removed under the conditions of a distillation temperature of 120° C. to 150° C. and a degree of vacuum of 0.01 kPa to 0.03 kPa using a falling film distillation apparatus, and a centrifugal molecular distillation apparatus is used to obtain a high purity fatty acid partial ester as a fraction under the conditions of a distillation temperature of 160° C. to 230° C. and a degree of vacuum of 0.01 Torr to 0.2 Torr. The sodium metal can be removed as a distillation residue. By repeating molecular distillation for the obtained fraction, it is possible to further increase the purity and obtain a fatty acid partial ester having a smaller sodium metal content. It is also important to prevent mixing of a sodium metal component from an external environment by, for example, sufficiently cleaning the inside of the molecular distillation apparatus and increasing airtightness thereof using an appropriate method in advance. The fatty acid ester can be obtained from a professional (for example, Riken Vitamin Co., Ltd.).

(ii) Phosphorus Stabilizer

The polycarbonate resin material used in the invention preferably further contains various phosphorus stabilizers for the main purpose of improving the thermal stability during molding. Examples of the phosphorus stabilizer include phosphorous acid, phosphoric acid, phosphonous acid, phosphonic acid, and esters thereof. The phosphorus stabilizer further contains a tertiary phosphine.

Specific examples of phosphite compounds include triphenyl phosphite, tris(nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, 2,2-methylenebis(4,6-di-tert-butylphenyl)octyl phosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritol diphosphite, bis(2,4-di-tert-butylphenyl)pentaerythritol diphosphite, bis(2,6-di-tert-butyl-4-methylphenyl) pentaerythritol diphosphite, bis(2,6-di-tert-butyl-4-ethylphenyl) pentaerythritol diphosphite, phenylbisphenol A pentaerythritol diphosphite, bis(nonylphenyl) pentaerythritol diphosphite, and dicyclohexyl pentaerythritol diphosphite.

Further, other phosphite compounds that can react with dihydric phenols and have a cyclic structure can also be used. Examples of other phosphite compounds include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl) phosphite, and 2,2'-ethylidenebis(4-methyl-6-tert-butylphenyl) (2-tert-butyl-4-methylphenyl)phosphite.

Examples of phosphate compounds include tributyl phosphate, trimethyl phosphate, tricresyl phosphate, triphenyl phosphate, trichlorophenyl phosphate, triethyl phosphate, diphenyl cresyl phosphate, diphenyl monoorthoxenyl phosphate, tributoxyethyl phosphate, dibutyl phosphate, dioctyl phosphate, and diisopropyl phosphate, and triphenyl phosphate and trimethyl phosphate are preferred.

Examples of phosphonite compounds include tetrakis(2,4-di-tert-butylphenyl)-4,4'-biphenylene diphosphonate, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenylphosphonite, bis(2,4-di-tert-butylphenyl)-3-phenyl-phenylphosphonite, bis(2,6-di-n-butylphenyl)-3-phenyl-phenylphosphonite, bis(2,6-di-tert-butylphenyl)-4-phenyl-phenylphosphonite, and bis(2,6-di-tert-butylphenyl)-3-phenyl-phenylphosphonite. Tetrakis(di-tert-butylphenyl)-biphenylene diphosphonite and bis(di-tert-butylphenyl)-phenyl-phenylphosphonite are preferred, and tetrakis(2,4-di-tert-butylphenyl)-biphenylene diphosphonite and bis(2,4-di-tert-butylphenyl)-phenyl-phenylphosphonite are more preferred. The phosphonite compounds can be preferably used in combination with the above phosphite compounds having an aryl group in which two or more alkyl groups are substituted.

Examples of phosphonate compounds include dimethyl benzenephosphonate, diethyl benzenephosphonate, and dipropyl benzenephosphonate.

Examples of the tertiary phosphine include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine, and diphenylbenzylphosphine. Particularly preferred tertiary phosphine is triphenylphosphine.

The phosphorus stabilizer may be used alone or in combination of two or more thereof. Among the above phosphorus stabilizers, phosphite compounds or phosphonite compounds are preferred. In particular, tris(2,4-di-tert-butylphenyl)phosphite, tetrakis(2,4-di-tert-butylphenyl)-4,4'-biphenylene diphosphonite, and bis(2,4-di-tert-butylphenyl)-phenyl-phenylphosphonite are preferred. Combination of these compounds with phosphate compounds is also preferred.

(iii) Hindered Phenolic Antioxidants

The polycarbonate resin material used in the invention can contain a hindered phenolic antioxidants for the main purpose of improving thermal stability and heat aging resistance during molding. Examples of the hindered phenolic antioxidants include α-tocopherol, butylhydroxytoluene, sinapyl alcohol, vitamin E, n-octadecyl-β-(4'-hydroxy-3',5'-di-tert-butylphenyl)propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis (2,6-di-tert-butylphenol), 2,2'-methylenebis(4-methyl-6-cyclohexylphenol), 2,2'-dimethylene-bis(6-α-methyl-benzyl-p-cresol)-2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl-6-(3-tert-butyl-5-methyl-2-hydroxybenzyl) phenyl] terephthalate, 3, 9-bis(2-[3-(3-tert-butyl-4-hydroxy-5-methylphenyl) propionyloxy]-1,1,-dimethylethyl)-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-di-thiobis(2,6-di-tert-butylphenol), 4,4'-tri-thiobis(2,6-di-tert-butylphenol), 2,2-thiodiethylene bis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylene bis(3,5-di-tert-butyl-4-hydroxyhydrocinnamide), N, N'-bis[3-(3,5-di-tert-butyl-4-hydroxyphenyl)propionyl]hydrazine, 1,1,3-tris (2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris2 [3(3,5-di-tert-butyl-4-hydroxyphenyl)propionyloxy]ethyl isocyanurate, and tetrakis[methylene-3-(3',5'-di-tert-butyl-4-hydroxyphenyl)propionate]methane. All these hindered phenolic antioxidants are readily available. The hindered phenolic antioxidants may be used alone or in combination of two or more thereof.

The content of the (ii) phosphorus stabilizer and/or the (iii) hindered phenol antioxidant is preferably 0.0001 to 1 part by weight, more preferably 0.001 to 0.5 parts by weight, and still more preferably 0.005 to 0.1 parts by weight with respect to 100 parts by weight of the polycarbonate resin. When the content of the stabilizer is much lower than the above range, a good stabilization effect is difficult to obtain, and when the content of the stabilizer is much higher than the above range, a deterioration in physical properties of the material and contamination to the mold during the molding may occur.

As the polycarbonate resin material used in the invention, antioxidants other than the hindered phenol antioxidant can be appropriately used. Examples of other antioxidants include pentaerythritol tetrakis(3-mercaptopropionate), pentaerythritol tetrakis(3-laurylthiopropionate), and glycerol-3-stearylthiopropionate. The amount of these other antioxidants used is preferably 0.001 to 0.05 parts by weight with respect to 100 parts by weight of the polycarbonate resin.

(iv) Flow Modifier

The polycarbonate resin material used in the invention can contain a flow modifier as long as the effects of the invention are not impaired. Preferred examples of the flow modifier include styrene-based oligomers, polycarbonate oligomers (including highly branched, hyperbranched, and cyclic oligomer oligomers), polyalkylene terephthalate oligomers (including highly branched, hyperbranched, and cyclic oligomer oligomers), highly branched and hyper-branched aliphatic polyester oligomers, terpene resins, and polycaprolactone. The content of the flow modifier is suitably 0.1 to 30 parts by weight, preferably 1 to 20 parts by weight, and more preferably 2 to 15 parts by weight with respect to 100 parts by weight of the polycarbonate resin. Polycaprolactone is particularly preferred, and a composition ratio is particularly preferably 2 to 7 parts by weight with respect to 100 parts by weight of the polycarbonate resin. The molecular weight of polycaprolactone is 1,000 to 70,000, preferably 1,500 to 40,000, more preferably 2,000 to 30,000, and still more preferably 2,500 to 15,000 in terms of number average molecular weight.

(v) Ultraviolet Absorber

The polycarbonate resin material used in the invention can contain an ultraviolet absorber. Specific examples of the ultraviolet absorber include benzophenone-based ultraviolet absorbers such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-Hydroxy-4-methoxybenzophenone-5-sulfonic acid hydrate, 2,2'-dihydroxy-4-methoxybenzopherione, 2,2', 4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Specific examples of the ultraviolet absorber include benzotriazole-based ultraviolet absorbers such as a polymer having a 2-hydroxyphenyl-2H-benzotriazole skeleton, for example, 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl) benzotriazole, 2,2'-methylenebis(4-cumyl-6-benzotriazolephenyl), 2,2'-p-phenylenebis(1,3-benzoxazine-4-one), 2-[2-hydroxy-3-(3,4,5,6-tetrahydrophthalimidomethyl)-5-methylphenyl] benzotriazole, a copolymer of 2-(2'-hydroxy-5-methacryloxyethylphenyl)-2H-benzotriazole with a vinyl-based monomer copolymerizable with this monomer, and a copolymer of 2-(2'-hydroxy-5-acryloxyethylphenyl)-2H-benzotriazole with a vinyl-based monomer copolymerizable with this monomer.

Specific examples of the ultraviolet absorber include hydroxyphenyltriazine-based ultraviolet absorbers such as 2-(4,6-diphenyl-1,3,5-triazine-2-yl)-5-hexyloxyphenol, 2-(4,6-diphenyl-1,3,5-triazine-2-yl)-5-methyloxyphenol, 2-(4,6-diphenyl-1,3,5-triazine-2-yl)-5-ethyloxyphenol, 2-(4,6-diphenyl-1,3,5-triazine-2-yl)-5-propyloxyphenol, and 2-(4,6-diphenyl-1,3,5-triazine-2-yl)-5-butyloxyphenol. Further, examples thereof include compounds in which a phenyl group of the above-described exemplary compounds is a 2,4-dimethylphenyl group, such as 2-(4,6-bis(2,4-dimethylphenyl)-1,3,5-triazine-2-yl)-5-hexyloxyphenol.

Specific examples of the ultraviolet absorber include cyclic imino ester-based ultraviolet absorbers such as 2,2'-p-phenylene bis(3,1-benzoxazin-4-one), 2,2'-(4,4'-diphenylene) bis(3,1-benzoxazin-4-one), and 2,2'-(2,6-naphthalene) bis(3,1-benzoxazin-4-one).

In addition, specific examples of the ultraviolet absorber include cyanoacrylate-based ultraviolet absorbers such as 1,3-bis[(2'-cyano-3',3'-diphenylacryloyl)oxy]-2,2-bis[(2-cyano-3,3-diphenylacryloyl)oxy]methyl)propane, and 1,3-bis-[(2-cyano-3,3-diphenylacryloyl)oxy]benzene.

Further, the ultraviolet absorber may be a polymer-type ultraviolet absorber obtained by copolymerizing an ultraviolet-absorbing monomer and/or a photo-stabilizing monomer having a hindered amine structure with a monomer such as alkyl (meth)acrylate by adopting a structure of a monomer compound capable of radical polymerization. Preferred examples of the ultraviolet-absorbing monomer include compounds having a benzotriazole skeleton, a benzophenone skeleton, a triazine skeleton, a cyclic imino ester skeleton, and a cyanoacrylate skeleton in an ester substituent of a (meth)acrylate.

Among the above, benzotriazole-based and hydroxyphenyltriazine-based ultraviolet absorbers are preferred in terms of ultraviolet absorbing capability, and cyclic imino ester-based and cyanoacrylate-based ultraviolet absorbers are preferred in terms of heat resistance and hue. The ultraviolet absorbers may be used alone or in combination of two or more thereof.

The content of the ultraviolet absorber is preferably 0.1 to 2 parts by weight, more preferably 0.2 to 1.5 parts by weight, and still more preferably 0.3 to 1 part by weight with respect to 100 parts by weight of the polycarbonate resin.

The polycarbonate resin material used in the invention can further contain various additives such as a bluing agent, a fluorescent dye, an antistatic agent, a flame retardant, and a dye and pigment. These additives can be appropriately selected and contained as long as the effects of the invention are not impaired.

The bluing agent is preferably contained in the resin material at 0.05 ppm to 3.0 ppm (weight ratio). Typical examples of the bluing agent include Macrolex Violet B and Macrolex Blue RR manufactured by Bayer Holding Ltd., and Polysynthren Blue RLS manufactured by Clariant AG.

Examples of the fluorescent dye (including a fluorescent brightener) include a coumarin-based fluorescent dye, a benzopyran-based fluorescent dye, a perylene-based fluorescent dye, an anthraquinone-based fluorescent dye, a thioindigo-based fluorescent dye, a xanthene-based fluorescent dye, a xanthone-based fluorescent dye, a thioxanthene-based fluorescent dye, a thioxanthone-based fluorescent dye, a thiazin-based fluorescent dye, and a diaminostilbene-based fluorescent dye. The blending amount of the fluorescent dye (including the fluorescent brightener) is preferably 0.0001 to 0.1 parts by weight with respect to 100 parts by weight of the polycarbonate resin.

Examples of the flame retardant include a sulfonic acid metal salt-based flame retardant, a halogen-containing compound-based flame retardant, a phosphorus-containing compound-based flame retardant, and a silicon-containing compound-based flame retardant. Among these, the sulfonic acid metal salt-based flame retardant is preferred. The blending amount of the flame retardant is generally preferably in a range of 0.01 to 1 part by weight, and more preferably in a range of 0.05 to 1 part by weight with respect to 100 parts by weight of the polycarbonate.

A method for blending an additive in the polycarbonate resin used in the invention is not particularly limited, and a known method can be used. Examples of the most commonly used method include a method in which the polycarbonate resin and the additive are preliminarily mixed, then the mixture is charged into an extruder to be melt-kneaded, the extruded thread is cooled, and the thread is cut by a pelletizer to produce a pellet-shaped molding material.

As the extruder in the above method, either a single-screw extruder or a twin-screw extruder can be used, and the twin-screw extruder is preferred from the viewpoints of productivity and kneadability. Typical examples of the twin-screw extruder include ZSK (product name, manufactured by Werner 6 Pfleiderer). Examples of the similar type twin-screw extruder include TEX (product name, manufactured by The Japan Steel Works, Ltd.), TEM (product name, manufactured by Toshiba Machine Co., Ltd.), and KTX (product name, manufactured by Kobe Steel, Ltd.). As the extruder, an extruder including a vent capable of remove moisture in a raw material and volatile gas generated from the melt-kneaded resin can be preferably used. A vacuum pump is preferably provided to efficiently discharge the generated moisture and volatile gas from the vent to the outside of the extruder. A foreign substance can be removed from a resin composition by disposing a screen for removing the foreign substance and the like mixed in an extrusion raw material at a zone in front of an extruder die section. Examples of the screen include a wire mesh, a screen changer, and a sintered metal plate (such as a disc filter).

Further, the additive can be independently supplied to the extruder, and is preferably pre-mixed with the resin raw material as described above. Examples of a pre-mixing device include a Nauta mixer, a V-type blender, a Henschel mixer, a mechanochemical device, and an extrusion mixer. A more preferred method is, for example, a method in which a part of the raw material resin and the additive are mixed with each other with a high-speed stirrer such as a Henschel mixer to prepare a master agent, and then the master agent is mixed with all the remaining amount of the resin raw materials with a stirrer not operating at high speed such as a Nauta mixer.

The resin extruded from the extruder is directly cut to be pelletized, or is pelletized by forming strands and then cutting the strands with a pelletizer. When it is necessary to reduce an influence of external dust or the like, it is preferable to clean the atmosphere around the extruder. Further, in the production of pellets, narrowing of a shape distribution of pellets, a further reduction in miscut products, a further reduction in fine powder produced during conveyance or transportation, and a reduction in bubbles (vacuum bubbles) produced in strands or pellets can be carried out by using various methods that have been proposed for polycarbonate resins for optical disks. Examples of a method for reducing miscut products include means such as temperature control of threads during cutting with a pelletizer, blowing of ion air during cutting, optimization of a rake angle of the pelletizer, and proper formulation of a release agent, and a method of filtering a mixture of cut pellets and water to separate water and miscut products from the pellets.

<Substrate>

A method for producing the substrate in the invention is not particularly limited, and any molding method generally adopted for the polycarbonate resin material can be adopted. Examples of the molding method include an injection molding method, an ultra-high-speed injection molding method, an injection compression molding method, a two-color molding method, a hollow molding method such as gas assist, a molding method using a heat-insulating mold, a molding method using a rapidly heated mold, foaming molding (including a supercritical fluid), insert molding, an in-mold coating (IMC) molding method, an extrusion molding method, a sheet molding method, a heat molding method, a rotary molding method, a laminate molding method, and a press molding method. A molding method using a hot runner method can also be used.

The polycarbonate resin material used in the invention may also be formed into a sheet-like or film-like molded product by a method such as a melt extrusion method or a solution casting method (casting method). A specific method of the melt extrusion method includes, for example, a method in which the polycarbonate resin material is quantitatively supplied to the extruder and heated to melt, and the molten resin is extruded from a tip portion of a T die onto a mirror-finished roll into a sheet shape, drawn while being cooled by a plurality of rolls, and cut into an appropriate size at the time of solidification or wound up. A specific method of the solution casting method includes, for example, a method in which a solution (concentration: 5% to 40%) obtained by dissolving the polycarbonate resin material in methylene chloride is cast from a T-die onto a mirror-finished stainless steel plate, a sheet is peeled while passing through an oven controlled in temperature in a stepwise manner, a solvent is removed, and then the sheet is cooled and wound.

As the substrate in the invention, a laminated film can also be used. As a method for producing the laminated film, any method may be used, and in particular, a thermal compression bonding method or a coextrusion method is preferred. Any method is adopted as the thermal compression bonding method, and for example, a method of thermally compression-bonding a film of a polycarbonate resin material using a laminating machine or a pressing machine, and a method of thermal compression bonding immediately after extrusion are preferred, and in particular, a method of continuously thermally compression-bonding a film of a polycarbonate resin material immediately after extrusion is industrially advantageous.

A thickness of the substrate is preferably 1 μm to 500 μm, more preferably 10 μm to 300 μm, and most preferably 50 μm to 250 μm. When the substrate is too thin, the handling becomes difficult, which is not preferred. When the substrate is too thick, the flexibility is impaired and the cost is increased, which is not preferred.

In order to improve the adhesiveness to the conducting film, the substrate in the invention may be subjected to at least one surface treatment selected from the group consisting of a corona discharge treatment, a glow discharge treatment, a flame treatment, an ultraviolet irradiation treatment, an electron beam irradiation treatment, and an ozone treatment. As a method for improving the adhesiveness to the conducting film, a hard coat layer may be provided on a surface of the substrate. The hard coat layer contains a resin cured product obtained by curing a resin composition. The resin composition preferably contains at least one selected from a thermosetting resin composition, an ultraviolet curable resin composition, and an electron beam curable resin composition. Examples of the curable resin composition include an epoxy resin, a phenoxy resin, a melamine-based resin, and a silicon-based resin.

<Conducting Film>

Examples of the conducting film in the invention include a metal thin film such as a copper foil and a silver foil, and a carbon nanotube thin film. Among these, from the viewpoint of transparency, it is preferable to use a metal thin film, and it is particularly preferable to use a copper foil. The copper foil includes an electrolytic foil and a rolled foil, either of which can be used. A thickness of the copper foil is preferably 1 μm to 70 μm. When the copper foil is thick, transparency is impaired, which is not preferred. When the copper foil is too thin, the electrical conductivity is impaired, which is not preferred. The surface of the copper foil may be a surface of an untreated copper foil, the surface may be subjected to a metal plating treatment, that is, may be plated with one or more metals selected from, for example, nickel, iron, zinc, gold, silver, aluminum, chromium, titanium, palladium or tin, and a surface of the untreated copper foil or a surface of the metal-plated copper foil may be treated with a chemical such as a silane coupling agent. The metal plating treatment is preferably a metal plating treatment with one or more metals selected from nickel, iron, zinc, gold, and aluminum, and more preferably a metal plating treatment with nickel or aluminum.

The conducting film can take any antenna pattern shape such as a loop shape. Further, a terminal portion can be installed at an end portion of the conducting film.

<Antenna>

The conductive film according to the invention has a low dielectric characteristic and is excellent in adhesion to a conducting film, and thus can be suitably used for various antennas. Examples of the antennas include a monopole antenna, a dipole antenna, a whip antenna, a loop antenna, and a slot antenna. Examples of the uses of the antennas include a Wi-Fi antenna, a GPS antenna, a ground digital antenna, a one-segment and full-segment antenna, an RFID antenna, and a small cell base station antenna. However, the shapes and uses of the antennas are not limited to those described above.

EXAMPLES

Next, the invention will be described in more detail with reference to Examples, but the invention is not limited to the following Examples. In the following Examples and Comparative Examples, the measurement methods for the respective characteristics are as follows.

(1) Viscosity Average Molecular Weight

The viscosity average molecular weight of the polycarbonate resin material was measured by the following method. The specific viscosity ($\eta_{SP}$) at 20° C. of a solution prepared by dissolving 0.7 g of a polycarbonate resin in 100 ml of methylene chloride was measured. The Mv calculated according to the following equation was taken as the viscosity average molecular weight.

$$\eta_{SP}/c = [\eta] + 0.45 \times [\eta]^2 c$$

$$[\eta] = 1.23 \times 10^{-4} Mv^{0.83}.$$

$\eta_{SP}$: specific viscosity
$\eta$: intrinsic viscosity
C: constant (=0.7)
Mv: viscosity average molecular weight (2) Relative Dielectric Constant and Dielectric Loss Tangent The relative dielectric constant and the dielectric loss tangent of the polycarbonate resin material at 1 GHz and 10 GHz were measured by the cavity resonator using a KEYCOM dielectric constant meter (network analyzer: Anritsu MS4622B).

(3) Adhesion Strength (Peel Strength) between Transparent Substrate and Metal Thin Film The peel strength of the copper foil was measured by a tensile tester while the copper foil was peeled in a direction of 90° with respect to the copper foil removal surface at a speed of 50 mm per minute in accordance with JIS C5016-1994, and the obtained value was used as the adhesion strength.

(4) Bendability

The transparent substrate was cut into 50 mm×100 mm, and a state after the transparent substrate was bent at 180° was visually evaluated. A case where the transparent substrate was broken was evaluated as B, and a case where the transparent substrate was not broken was evaluated as A.

(5) Transmission Loss

A micro-strap line having a length of 10 cm was prepared by etching the transparent conductive film, and the transmission loss at 10 GHz was measured using the network analyzer.

(6) Total Light Transmittance

The total light transmittance of the transparent conductive film was measured using a haze meter (product name: NDH-3000, manufactured by Nippon Denshoku Industries Co., Ltd.).

Embodiment I of Invention

Example I-1

Into a reactor equipped with a thermometer, a stirrer, and a reflux condenser, 3,844 parts of a 48% sodium hydroxide aqueous solution and 22,380 parts of ion exchange water were charged, 3,984 parts of 2,2-bis(4-hydroxy-3-methylphenyl)propane (Bis-C, manufactured by Honshu Chemical Industry Co., Ltd.) and 7.53 parts of hydrosulfite (manufactured by Wako Pure Chemical Industries, Ltd.) were dissolved therein, 13,210 parts of methylene chloride was then added thereto, and 2,000 parts of phosgene was blown thereto under stirring at 15° C. to 25° C. over about 60 minutes. After the end of blowing phosgene, 640 parts of the 48% sodium hydroxide aqueous solution and 93.2 parts of p-tert-butylphenol were added, stirring was resumed, and 3.24 parts of triethylamine was added after emulsification and stirred at 28° C. to 33° C. for 1 hour to complete the reaction.

After completion of the reaction, the product was diluted with methylene chloride, rinsed with water, then made acidic with hydrochloric acid, rinsed with water, and further rinsed with water repeatedly until the conductivity of the water phase thereof was substantially the same as that of ion exchange water to obtain a methylene chloride solution of the polycarbonate resin. Next, the solution was passed through a filter having an opening of 0.3 μm, then the solution was added dropwise to warm water in a kneader with an isolation chamber having a foreign substance outlet port in a bearing portion, and the polycarbonate resin was made into flakes while distilling off methylene chloride, followed by pulverization and drying of the solution containing flakes to obtain a powder.

Thereafter, 0.05 parts by weight of Irganox 1076 (hindered phenol antioxidant manufactured by BASF Japan Ltd.), 0.1 parts by weight of ADK STAB PEP-36 (phosphorus stabilizer manufactured by ADEKA CORPORATION), and 0.5 parts by weight of ADK STAB LA-31 (benzotriazole-based ultraviolet absorber manufactured by ADEKA CORPORATION) were added to 100 parts by weight of the powder and mixed uniformly, and then the powder was melt-kneaded and extruded by a vented twin-screw extruder (KTX-46 manufactured by Kobe Steel, Ltd.) while removing gas to obtain polycarbonate resin composition pellets.

The obtained pellets were dried at 120° C. for 4 hours using a shelf dryer of a reduced pressure drying type. The pellets were charged into a heating hopper of a melt extruder heated to 110° C., and melt-extruded at 290° C. As a filter for removing a foreign substance in the molten polymer, a disc-shaped filter made of SUS non-woven fabric and having an average opening of 10 μm was used. The molten resin after filtration was extruded by a die set to 290° C. onto a rotating cooling roll surface having a diameter of 800 mm and a roll surface length of 1,800 mm. In the extrusion die, a lip width was 1,500 mm and a lip gap was about 2 mm. In order to uniformly cool and take out the film, the entire width of the film was brought into close contact with the cooling roll surface by an electrostatic adhesion method. A cleanly polished stainless steel piano wire was used as an electrode for electrostatic adhesion. A positive electrode of a DC power source was connected to the piano wire, and a cooling drum side was grounded. The applied voltage was 7 KV. By adjusting the rotation speed of the cooling roll, the film was taken out with a take-out roll to obtain a film having a predetermined thickness (150 μm).

Subsequently, the film was passed through a roll hanging type heating treatment machine and subjected to a heating treatment. Rolls having a diameter of 100 mm were alternately arranged in a vertical direction in the roll hanging type heating treatment machine. A distance between an upper roll and a lower roll was set to 1.6 m, and a distance between every other adjacent rolls was set to 100 mm, which was the same as the diameter of the roll. A film to be treated was prepared such that a length of the film staying in an oven in the roll hanging type heating treatment machine was about 50 m (residence time: 60 seconds). The hot air temperature of the oven in the heating treatment machine was 145° C., and the film tension at an outlet of the oven was 3.0 kg/(thickness: 100 μm×film width: 1,440 mm) (2.1 kg/s per section load). The film after exiting the oven was cooled to 60° C. or lower in the same roll hanging type heating treatment machine, and then taken out to cool to room temperature. After the heat treatment, both end portions of the film were removed by 70 mm to obtain a film having a width of 1,300 mm.

Thereafter, a copper foil having a thickness of 18 μm (product name CF-T9DA-SV-18, manufactured by Fukuda Metal Foil & Powder Co., Ltd.) was bonded to a corona discharge-treated polycarbonate film (transparent substrate) to prepare a transparent conductive film. Results of various evaluations are shown in Table 1.

Example I-2

Into a reactor equipped with a stirrer and a distillation column, 5,630 parts (22 mol) of BPC, 4,920 parts (23 mol) of diphenyl carbonate, and 0.000005 parts of sodium hydroxide and 0.0016 parts of tetramethylammonium hydroxide as catalysts were charged and the atmosphere was substituted with nitrogen. The mixture was dissolved while being heated to 180° C. Thereafter, the stirrer was rotated and the temperature in the reactor was kept at 220° C. The pressure in the reactor was reduced from 101.3 kPa to 13.3 kPa over 40 minutes while distilling off the by-produced phenol. Subsequently, a transesterification reaction was carried out for 80 minutes while maintaining the pressure in the reactor at 13.3 kPa and further distilling off phenol.

The pressure in the reactor was reduced from 13.3 kPa to 2 kPa in an absolute pressure, the temperature was further increased to 260° C., and the distilled phenol was removed to the outside of the system. Further, the temperature was continuously raised and the pressure in the reactor reached 0.3 Pa or less, then the pressure was maintained and a polycondensation reaction was carried out. The final temperature in the reactor was 295° C. The polycondensation reaction was completed when the stirrer of the reactor reached a predetermined stirring power. The polymerization reaction time in the reactor was 140 minutes. Next, in a molten state, 0.0023 parts ($4\times10^{-5}$ mol/1 mol of bisphenol) of a dodecylbenzene sulfonic acid tetrabutylphosphonium salt was added as a catalyst neutralizer, the reaction was continued at 295° C. and 10 Torr or less for 10 minutes, and the obtained polymer was sent to a vented twin-screw extruder (KTX-46 manufactured by Kobe Steel, Ltd.) with a gear pump. In the midway in the extruder, 0.1 parts by weight of a release agent: RIKESTER EW400 (pentaerythritol stearate, manufactured by Riken Vitamin Co., Ltd.), 0.05 parts by weight of a phosphorous antioxidant: Hostanox P-EPQ (tetrakis (2,4-tert-butylphenyl)-4,4'-biphenylene diphosphonite, manufactured by Clariant Japan AG.), and 0.03 parts by weight of a hindered phenol antioxidant: Irganox 1076 (3-[3,5-di-tert-butyl-4-hydroxyphenyl]octadecyl propionate, manufactured by BASF) were added to 100 parts by weight of the polymer, and the mixture was melt-kneaded and extruded while removing gas at an inlet barrel temperature of 230° C., an outlet barrel temperature of 270° C., a polycarbonate resin outlet temperature of 285° C., and extruded from an outlet of the twin-screw extruder into a strand shape, cooled and solidified with water, and then pelletized by a rotary cutter to obtain polycarbonate resin pellets. After that, operations same as in Example I-1 were performed. The results are shown in Table 1.

Example I-3

Operations same as in Example I-1 were performed except that monomers used were changed to 1,992 parts (7.8 mol) of 2,2-bis(4-hydroxy-3-methylphenyl) propane (Bis-C, manufactured by Honshu Chemical Industry Co., Ltd.) and 1,773 parts (7.8 mol) of 2,2-bis(4-hydroxyphenyl)propane (Bis-A, manufactured by Nippon Steel Chemical Co., Ltd.). The results are shown in Table 1.

Example I-4

Into a reactor equipped with a thermometer, a stirrer, and a reflux condenser, 3,844 parts of a 48% sodium hydroxide aqueous solution and 22,380 parts of ion exchange water were charged, 4,589 parts of 2,2-bis(4-hydroxy-3-tert-butyl) propane (Bis-OTBA, manufactured by Honshu Chemical Industry Co., Ltd.) and 9.18 parts of hydrosulfite (manufactured by Wako Pure Chemical Industries, Ltd.) were dissolved therein, 12,144 parts of methylene chloride and 43.5 parts of tetramethylammonium bromide (manufactured by Wako Pure Chemical Industries, Ltd.) were then added thereto, and 2,000 parts of phosgene was blown thereto under stirring at 15° C. to 25° C. over about 60 minutes. After the end of blowing phosgene, 640 parts of the 48% sodium hydroxide aqueous solution and 60.7 parts of p-tert-butylphenol were added, stirring was resumed, and 6.82 parts of triethylamine was added after emulsification and stirred at 28° C. to 33° C. for 1 hour to complete the reaction. After that, operations same as in Example I-1 were performed. The results are shown in Table 1.

Example I-5

Operations same as in Example I-4 were performed except that 3,828 parts of 2,2-bis(4-hydroxy-3,5-dimethylphenyl)propane (Bis-TMA, manufactured by Honshu Chemical Industry Co., Ltd.) was used instead of Bis-OTBA. The results are shown in Table 1.

Example I-6

Operations same as in Example I-1 were performed except that 5,000 g of the polycarbonate resin pellets according to Example 1 and 5,000 g of Panlite (registered trademark) L-1225L (manufactured by Teijin Limited) were dry-blended as polycarbonate resin pellets, and melt-kneaded and extruded by a vented twin-screw extruder (KTX-46 manufactured by Kobe Steel, Ltd.) while removing gas to obtain polycarbonate resin composition pellets. The results are shown in Table 1.

Comparative Example I-1

Operations same as in Example I-1 were performed except that an aromatic polycarbonate resin (polycarbonate resin formed of bispherol A, Panlite (registered trademark) L-1225L (product name) manufactured by Teijin Limited) was used as the polycarbonate resin pellets. The results are shown in Table 1.

Comparative Example I-2

Operations same as in Example I-1 were performed except that a polyethylene terephthalate resin (TRN-8550 (product name), manufactured by Teijin Limited) was used instead of the polycarbonate resin pellets. The results are shown in Table 1.

Comparative Example I-3

Operations same as in Example I-1 were performed except that monomers used were changed to 1,593 parts (6.2 mol) of 2,2-bis(4-hydroxy-3-methylphenyl)propane, 2,128 parts (9.3 mol) of 2,2-bis(4-hydroxyphenyl)propane, and 186.4 parts of p-tert-butylphenol. The results are shown in Table 1.

Comparative Example I-4

Operations same as in Example I-1 were performed except that 1,500 g of the polycarbonate resin pellets according to Example 1 and 3,500 g of Panlite (registered trademark) L-1225L (manufactured by Teijin Limited) were dry-blended as polycarbonate resin pellets, and melt-kneaded and extruded by a vented twin-screw extruder (KTX-46 manufactured by Kobe Steel, Ltd.) while removing gas to obtain polycarbonate resin composition pellets. The results are shown in Table 1.

TABLE 1

| | Unit | Example I-1 | Example I-2 | Example I-3 | Example I-4 | Example I-5 | Example I-6 | Comparative Example I-1 | Comparative Example I-2 | Comparative Example I-3 | Comparative Example I-4 |
|---|---|---|---|---|---|---|---|---|---|---|---|
| Thickness | μm | 150 | 150 | 150 | 100 | 100 | 75 | 100 | 125 | 150 | 125 |
| Viscosity average | ×1000 | 26.9 | 16.3 | 20.1 | 24.5 | 18.9 | 22.5 | 19.7 | Not measurable | 12.5 | 21.3 |

TABLE 1-continued

| | Unit | Example I-1 | Example I-2 | Example I-3 | Example I-4 | Example I-5 | Example I-6 | Comparative Example I-1 | Comparative Example I-2 | Comparative Example I-3 | Comparative Example I-4 |
|---|---|---|---|---|---|---|---|---|---|---|---|
| molecular weight | | | | | | | | | because solvent is insoluble | | |
| Relative dielectric constant (1 GHz) | — | 2.63 | 2.65 | 2.65 | 2.54 | 2.48 | 2.67 | 2.81 | 2.92 | 2.66 | 2.77 |
| Dielectric loss tangent (1 GHz) | — | 0.0017 | 0.0019 | 0.0027 | 0.0021 | 0.0025 | 0.0029 | 0.0072 | 0.0085 | 0.0036 | 0.0055 |
| Relative dielectric constant (10 GHz) | — | 2.49 | 2.51 | 2.52 | 2.41 | 2.33 | 2.54 | 2.61 | 2.77 | 2.54 | 2.66 |
| Dielectric loss tangent (10 GHz) | — | 0.0012 | 0.0015 | 0.0022 | 0.0016 | 0.0019 | 0.0025 | 0.0056 | 0.0073 | 0.0031 | 0.0043 |
| Bendability | — | A | A | A | A | A | A | A | B | B | A |
| Peel strength | N/mm | 2.1 | 2.1 | 1.8 | 1.5 | 1.6 | 1.2 | 0.4 | 0.3 | 1.2 | 0.5 |
| Total light transmittance | % | 78 | 78 | 75 | 75 | 77 | 81 | 45 | 48 | 74 | 75 |
| Transmission loss | dB | 0.15 | 0.16 | 0.23 | 0.18 | 0.16 | 0 | 0.55 | 0.82 | 0.45 | 0.45 |

Embodiment II of Invention

Example II-1

Into a reactor equipped with a thermometer, a stirrer, and a reflux condenser, 4,760 parts of a 48% sodium hydroxide aqueous solution and 20,779 parts of ion exchange water were charged, 4,271 parts of 1,1-bis(4-hydroxy-3-methylphenyl)cyclohexane (manufactured by Honshu Chemical Industry Co., Ltd.) and 8.54 parts of hydrosulfite (manufactured by Wako Pure Chemical Industries, Ltd.) were dissolved therein, 15,945 parts of methylene chloride was then added thereto, and 2,000 parts of phosgene was blown thereto under stirring at 15° C. to 25° C. over about 60 minutes. After the end of blowing phosgene, 595 parts of the 48% sodium hydroxide aqueous solution and 86.6 parts of p-tert-butylphenol were added, stirring was resumed, and 5.01 parts of triethylamine was added after emulsification and stirred at 26° C. to 33° C. for 1 hour to complete the reaction.

After completion of the reaction, the product was diluted with methylene chloride, rinsed with water, then made acidic with hydrochloric acid, rinsed with water, and further rinsed with water repeatedly until the conductivity of the water phase thereof was substantially the same as that of ion exchange water to obtain a methylene chloride solution of the polycarbonate resin. Next, the solution was passed through a filter having an opening of 0.3 μm, then the solution was added dropwise to warm water in a kneader with an isolation chamber having a foreign substance outlet port in a bearing portion, and the polycarbonate resin was made into flakes while distilling off methylene chloride, followed by pulverization and drying of the solution containing flakes to obtain a powder.

Thereafter, 0.05 parts by weight of Irganox 1076 (hindered phenol antioxidant manufactured by BASF Japan Ltd.), 0.1 parts by weight of ADK STAB PEP-36 (phosphorus stabilizer manufactured by ADEKA CORPORATION), and 0.5 parts by weight of ADK STAB LA-31 (benzotriazole-based ultraviolet absorber manufactured by ADEKA CORPORATION) were added to 100 parts by weight of the powder and mixed uniformly, and then the powder was melt-kneaded and extruded by a vented twin-screw extruder (KTX-46 manufactured by Kobe Steel, Ltd.) while removing gas to obtain polycarbonate resin composition pellets (polycarbonate resin material).

The obtained pellets were dried at 120° C. for 4 hours using a shelf dryer of a reduced pressure drying type. The pellets were charged into a heating hopper of a melt extruder heated to 110° C., and melt-extruded at 290° C. As a filter for removing a foreign substance in the molten polymer, a disc-shaped filter made of SUS non-woven fabric and having an average opening of 10 μm was used. The molten resin after filtration was extruded by a die set to 290° C. onto a rotating cooling roll surface having a diameter of 800 mm and a roll surface length of 1,800 mm. In the extrusion die, a lip width was 1,500 mm and a lip gap was about 2 mm. In order to uniformly cool and take out the film, the entire width of the film was brought into close contact with the cooling roll surface by an electrostatic adhesion method. A cleanly polished stainless steel piano wire was used as an electrode for electrostatic adhesion. A positive electrode of a DC power source was connected to the piano wire, and a cooling drum side was grounded. The applied voltage was 7 KV. By adjusting the rotation speed of the cooling roll, the film was taken out with a take-out roll to obtain a film having a predetermined thickness (150 μm).

Subsequently, the film was passed through a roll hanging type heating treatment machine and subjected to a heating treatment. Rolls having a diameter of 100 mm were alternately arranged in a vertical direction in the roll hanging type heating treatment machine. A distance between an upper roll and a lower roll was set to 1.6 m, and a distance between every other adjacent rolls was set to 100 mm, which was the same as the diameter of the roll. A film to be treated was prepared such that a length of the film staying in an oven in the roll hanging type heating treatment machine was about 50 m (residence time: 60 seconds). The hot air temperature of the oven in the heating treatment machine was 145° C., and the film tension at an outlet of the oven was 3.0 kg/(thickness: 100 μm×film width: 1,440 mm) (2.1 kg/s per section load). The film after exiting the oven was cooled to 60° C. or lower in the same roll hanging type heating treatment machine, and then taken out to cool to room temperature. After the heat treatment, both end portions of the film were removed by 70 mm to obtain a film having a width of 1,300 mm.

Thereafter, a copper foil having a thickness of 18 μm (product name CF-T9DA-SV-18, manufactured by Fukuda Metal Foil & Powder Co., Ltd.) was bonded to a corona discharge-treated polycarbonate film (transparent substrate) to prepare a transparent conductive film. Results of various evaluations are shown in Table 2.

Example II-2

Into a reactor equipped with a stirrer and a distillation column, 6,510 parts (22 mol) of 1,1-bis(4-hydroxy-3-methylphenyl)cyclohexane, 4,920 parts (23 mol) of diphenyl carbonate, and 0.000005 parts of sodium hydroxide and 0.0016 parts of tetramethylammonium hydroxide as catalysts were charged and the atmosphere was substituted with nitrogen. The mixture was dissolved while being heated to 180° C. Thereafter, the stirrer was rotated and the temperature in the reactor was kept at 220° C. The pressure in the reactor was reduced from 101.3 kPa to 13.3 kPa over 40 minutes while distilling off the by-produced phenol. Subsequently, a transesterification reaction was carried out for 80 minutes while maintaining the pressure in the reactor at 13.3 kPa and further distilling off phenol.

The pressure in the reactor was reduced from 13.3 kPa to 2 kPa in an absolute pressure, the temperature was further increased to 260° C., and the distilled phenol was removed to the outside of the system. Further, the temperature was continuously raised and the pressure in the reactor reached 0.3 Pa or less, then the pressure was maintained and a polycondensation reaction was carried out. The final temperature in the reactor was 295° C. The polycondensation reaction was completed when the stirrer of the reactor reached a predetermined stirring power. The polymerization reaction time in the reactor was 140 minutes. Next, in a molten state, 0.0023 parts ($4 \times 10^{-5}$ mol/1 mol of bisphenol) of a dodecylbenzene sulfonic acid tetrabutylphosphonium salt was added as a catalyst neutralizer, the reaction was continued at 295° C. and 10 Torr or less for 10 minutes, and the obtained polymer was sent to a vented twin-screw extruder (KTX-46 manufactured by Kobe Steel, Ltd.) with a gear pump. In the midway in the extruder, 0.1 parts by weight of a release agent: RIKESTER EW400 (pentaerythritol stearate, manufactured by Riken Vitamin Co., Ltd.), 0.05 parts by weight of a phosphorous antioxidant: hostanox P-EPQ (tetrakis(2,4-tert-butylphenyl)-4,4'-biphenylene diphosphonite, manufactured by Clariant Japan AG.), and 0.03 parts by weight of a hindered phenol antioxidant: Irganox 1076 (3-(3,5-di-tert-butyl-4-hydroxyphenyl octadecyl propionate, manufactured by BASF) were added to 100 parts by weight of the polymer, and the mixture was melt-kneaded and extruded while removing gas at an inlet barrel temperature of 230° C., an outlet barrel temperature of 270° C., a polycarbonate resin outlet temperature of 285° C., and extruded from an outlet of the twin-screw extruder into a strand shape, cooled and solidified with water, and then pelletized by a rotary cutter to obtain polycarbonate resin pellets. After that, operations same as in Example II-1 were performed. The results are shown in Table 2.

Example II-3

Operations same as in Example II-1 were performed except that the monomers used were changed to 2,136 parts (7.2 mol) of 1,1-bis(4-hydroxy-3-methylphenyl)cyclohexane (manufactured by Honshu Chemical Industry Co., Ltd.) and 1,647 parts (7.2 mol) of 2,2-bis(4-hydroxyphenyl)propane (bisphenol A, manufactured by Nippon Steel Chemical Co., Ltd.). The results are shown in Table 2.

Example II-4

Into a reactor equipped with a thermometer, a stirrer, and a reflux condenser, 4,665 parts of a 48% sodium hydroxide aqueous solution and 19,394 parts of ion exchange water were charged, 5,125 parts of 1,1-bis(3-tert-butyl-4-hydroxyphenyl)cyclohexane (manufactured by Honshu Chemical Industry Co., Ltd.) and 10.25 parts of hydrosulfite (manufactured by Wako Pure Chemical Industries, Ltd.) were dissolved therein, 14,882 parts of methylene chloride and 43.5 parts of tetrabutylammonium bromide (manufactured by Wako Pure Chemical Industries, Ltd.) were then added thereto, and 2,000 parts of phosgene was blown thereto under stirring at 15° C. to 25° C. over about 60 minutes. After the end of blowing phosgene, 555 parts of the 48% sodium hydroxide aqueous solution and 60.6 parts of p-tert-butylphenol were added, stirring was resumed, and 6.80 parts of triethylamine was added after emulsification and stirred at 26° C. to 33° C. for 1 hour to complete the reaction. After that, operations same as in Example II-1 were performed. The results are shown in Table 2.

Example II-5

Operations same as in Example II-4 were performed except that 4,370 parts of 1,1-bis(4-hydroxy-3,5-dimethylphenyl)cyclohexane (manufactured by Honshu Chemical Industry Co., Ltd.) was used instead of 1,1-bis(3-tert-butyl-4-hydroxyphenyl)cyclohexane. The results are shown in Table 2.

Example II-6

The same operations as in Example II-1 were performed except that 4,844 parts of 1,1-bis(4-hydroxy-3-methylphenyl)-3,3,5-trimethylcyclohexane (manufactured by Honshu Chemical Industry Co., Ltd.) was used instead of 1,1-bis(4-hydroxy-3-methylphenyl)cyclohexane. The results are shown in Table 2.

Example II-7

Operations same as in Example II-1 were performed except that 5,000 g of the polycarbonate resin pellets according to Example 1 and 5,000 g of an aromatic polycarbonate resin (polycarbonate resin formed of bisphenol A, Panlite (registered trademark) L-12251, (product name) manufactured by Teijin Limited) were dry-blended as polycarbonate resin pellets, and melt-kneaded and extruded by a vented twin-screw extruder (KTX-46 manufactured by Kobe Steel, Ltd.) while removing gas to obtain polycarbonate resin composition pellets. The results are shown in Table 2.

Comparative Example II-1

Operations same as in Example II-1 were performed except that Panlite (registered trademark) L-1225L (manufactured by Teijin Limited) was used as the polycarbonate resin pellets. The results are shown in Table 2.

Comparative Example II-2

Operations same as in Example II-1 were performed except that a polyethylene terephthalate resin (TRN-8550 (product name), manufactured by Teijin Limited) was used instead of the polycarbonate resin pellets. The results are shown in Table 2.

Comparative Example II-3

Operations same as in Example II-1 were performed except that the monomers used were changed to 1,709 parts (5.8 mol) of 1,1-bis(4-hydroxy-3-methylphenyl)cyclohexane, 1,977 parts (8.7 mol) of 2,2-bis(4-hydroxyphenyl)propane, and 129.9 parts of p-tert-butylphenol. The results are shown in Table 2.

Comparative Example II-4

Operations same as in Example II-1 were performed except that 1,500 g of the polycarbonate resin pellets according to Example 1 and 3,500 g of Panlite (registered trademark) L-1225L (manufactured by Teijin Limited) were dry-blended as polycarbonate resin pellets, and melt-kneaded and extruded by a vented twin-screw extruder (KTX-46 manufactured by Kobe Steel, Ltd.) while removing gas to obtain polycarbonate resin composition pellets. The results are shown in Table 2.

INDUSTRIAL APPLICABILITY

The invention provides a conductive film that can form a flexible film antenna having excellent antenna performance.

The invention claimed is:
1. A conductive film for antennas, in which
   a conducting film; and
   a substrate made of a polycarbonate resin material containing a polycarbonate resin are laminated, the polycarbonate resin containing, as main constituent units, a unit (A) represented by the following formula (1) and/or a unit (B) represented by the following formula (2):

[Chem. 1]

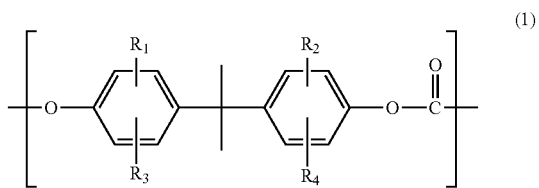

(1)

(in the formula (1), $R_1$ and $R_2$ each independently represent an alkyl group having 1 to 6 carbon atoms or a halogen atom, and $R_3$ and $R_4$ each independently represent a hydrogen atom, an alkyl group having 1 to 6 carbon atoms, or a halogen atom)

TABLE 2

| | Unit | Example II-1 | Example II-2 | Example II-3 | Example II-4 | Example II-5 | Example II-6 | Example II-7 | Comparative Example II-1 | Comparative Example II-2 | Comparative Example II-3 | Comparative Example II-4 |
|---|---|---|---|---|---|---|---|---|---|---|---|---|
| Thickness | μm | 150 | 150 | 150 | 100 | 100 | 100 | 100 | 100 | 125 | 150 | 150 |
| Viscosity average molecular weight | ×1000 | 15.7 | 17.1 | 18.2 | 20.1 | 19.5 | 19.9 | 17.7 | 19.7 | Not measurable because solvent is insoluble | 12.0 | 18.5 |
| Relative dielectric constant (1 GHz) | — | 2.58 | 2.57 | 2.69 | 2.38 | 2.50 | 2.52 | 2.67 | 2.81 | 2.92 | 2.73 | 2.76 |
| Dielectric loss tangent (1 GHz) | — | 0.0013 | 0.0014 | 0.0027 | 0.0016 | 0.0020 | 0.0018 | 0.0029 | 0.0072 | 0.0085 | 0.0031 | 0.0056 |
| Relative dielectric constant (10 GHz) | — | 2.43 | 2.45 | 2.52 | 2.10 | 2.38 | 2.39 | 2.54 | 2.61 | 2.77 | 2.54 | 2.56 |
| Dielectric loss tangent (10 GHz) | — | 0.0015 | 0.0015 | 0.0028 | 0.0018 | 0.0023 | 0.0021 | 0.0025 | 0.0056 | 0.0073 | 0.0032 | 0.0045 |
| Bendability | — | A | A | A | A | A | A | A | A | B | B | A |
| Peel strength | N/mm | 2.0 | 2.0 | 1.7 | 1.6 | 1.7 | 1.8 | 1.2 | 0.4 | 0.3 | 1.1 | 0.5 |
| Total light transmittance | % | 79 | 78 | 76 | 74 | 75 | 76 | 81 | 45 | 48 | 74 | 76 |
| Transmission loss | dB | 0.15 | 0.15 | 0.29 | 0.16 | 0.23 | 0.21 | 0.25 | 0.55 | 0.82 | 0.40 | 0.48 |

[Chem. 2]

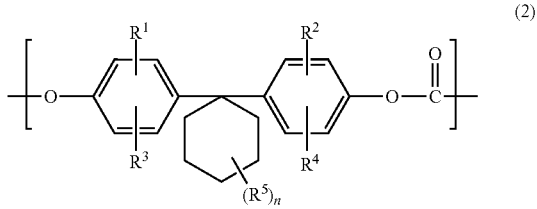

(2)

(in the formula (2), $R^1$ and $R^2$ each independently represent an alkyl group having 1 to 6 carbon atoms or a halogen atom, $R^3$ and $R^4$ each independently represents a hydrogen atom, an alkyl group having 1 to 6 carbon atoms, or a halogen atom, $R^5$ represents a halogen atom, an alkyl group having 1 to 20 carbon atoms, or a cycloalkyl group having 3 to 20 carbon atoms, and n represents an integer of 0 to 10).

2. The conductive film for antennas according to claim 1, wherein
the polycarbonate resin is a polycarbonate resin containing the unit (A) represented by the formula (1) as the main constituent unit.

3. The conductive film for antennas according to claim 1, wherein
the polycarbonate resin is a polycarbonate resin containing 45 mol % or more of the unit (A) represented by the formula (1) in all constituent units.

4. The conductive film for antennas according to claim 1, wherein
the unit (A) is a constituent unit derived from 2,2-bis(4-hydroxy-3-methylphenyl)propane.

5. The conductive film for antennas according to claim 1, wherein
the polycarbonate resin material has a viscosity average molecular weight of 15,000 to 40,000.

6. The conductive film for antennas according to claim 1, wherein
the polycarbonate resin is a polycarbonate resin containing the unit (B) represented by the formula (2) as the main constituent unit.

7. The conductive film for antennas according to claim 1, wherein
the polycarbonate resin is a polycarbonate resin containing 45 mol % or more of the unit (B) represented by the formula (2) in all the constituent units.

8. The conductive film for antennas according to claim 1, wherein
the unit (B) is a constituent unit derived from 1,1-bis(4-hydroxy-3-methylphenyl)cyclohexane, 1,1-bis(3-tert-butyl-4-hydroxyphenyl)cyclohexane or 1,1-bis(4-hydroxy-3-methylphenyl)-3,3,5-trimethylcyclohexane.

9. The conductive film for antennas according to claim 1, wherein
the polycarbonate resin material has a viscosity average molecular weight of 14,000 to 40,000.

10. The conductive film for antennas according to claim 1, wherein
the polycarbonate resin material has a dielectric loss tangent of 0.0005 to 0.0030 at a frequency of 1 GHz to 10 GHz measured according to a cavity resonator perturbation method.

11. The conductive film for antennas according to claim 1, wherein
the polycarbonate resin material contains 0.1 parts by weight to 2 parts by weight of an ultraviolet absorber with respect to 100 parts by weight of the polycarbonate resin.

12. The conductive film for antennas according to claim 1, wherein
the polycarbonate resin material contains 0.0001 parts by weight to 1 part by weight of a phosphorus stabilizer and/or a hindered phenol antioxidant with respect to 100 parts by weight of the polycarbonate resin.

13. The conductive film for antennas according to claim 1, wherein
the substrate is a film formed by an injection molding method or an injection compression molding method using the polycarbonate resin material.

14. The conductive film for antennas according to claim 1, wherein
the substrate is a film formed by a melt extrusion method using the polycarbonate resin material.

15. The conductive film for antennas according to claim 1, wherein
the substrate has a thickness of 11 μm to 500 μm, and the conducting film has a thickness of 1 μm to 70 μm.

16. The conductive film for antennas according to claim 1, wherein
the conducting film is a metal thin film.

17. The conductive film for antennas according to claim 16, wherein
the metal thin film is a copper foil, and an antenna pattern is formed by the copper foil.

18. The conductive film for antennas according to claim 1, wherein
the conducting film has a peel strength of 0.8 N/mm or more in a direction of 90 degrees with respect to the substrate.

19. The transparent conductive film for antennas according to claim 1, which has a total light transmittance of 50% or more.

20. An antenna comprising:
the conductive film according to claim 1.

* * * * *